(12) United States Patent
Lou et al.

(10) Patent No.: US 12,373,698 B2
(45) Date of Patent: Jul. 29, 2025

(54) SMALL AND FAST TRANSFORMER MODEL FOR MULTI-MODAL OR OTHER TASKS

(71) Applicant: Samsung Electronics Co., Ltd., Suwon-si (KR)

(72) Inventors: Qian Lou, Oviedo, FL (US); Yen-Chang Hsu, Fremont, CA (US); Burak Uzkent, Mountain View, CA (US); Ting Hua, Cupertino, CA (US); Yilin Shen, San Jose, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 18/073,383

(22) Filed: Dec. 1, 2022

(65) Prior Publication Data

US 2023/0177338 A1 Jun. 8, 2023

Related U.S. Application Data

(60) Provisional application No. 63/286,470, filed on Dec. 6, 2021.

(51) Int. Cl.
*G06N 3/082* (2023.01)
*G06V 10/772* (2022.01)
*G06V 10/82* (2022.01)

(52) U.S. Cl.
CPC ........... *G06N 3/082* (2013.01); *G06V 10/772* (2022.01); *G06V 10/82* (2022.01)

(58) Field of Classification Search
CPC ....... G06N 3/082; G06V 10/772; G06V 10/82
See application file for complete search history.

(56) References Cited

U.S. PATENT DOCUMENTS

| 10,482,157 B2 | 11/2019 | Konoshima |
| 10,635,965 B2 | 4/2020 | Chen et al. |

(Continued)

FOREIGN PATENT DOCUMENTS

| CN | 114169345 A | 3/2022 |
| CN | 114267333 A | 4/2022 |

OTHER PUBLICATIONS

Cahyawijaya, "Greenformers: Improving Computation and Memory Efficiency in Transformer Models via Low-Rank Approximation", Aug. 24, 2021, arXiv:2108.10808v1 [cs.LG] (81 Pages) (Year: 2021).*

(Continued)

*Primary Examiner* — David F Dunphy

(57) ABSTRACT

A method includes obtaining, using a first electronic device, a weight matrix associated with a trained transformer model. The method also includes factorizing the weight matrix into a dictionary weight matrix and an intermediate matrix. The method further includes pruning the intermediate matrix to generate a sparse intermediate matrix. The method also includes fine-tuning the sparse intermediate matrix based on a training dataset to generate a fine-tuned sparse intermediate matrix. The method further includes determining an index matrix and a coefficient matrix based on the fine-tuned sparse intermediate matrix. In addition, the method includes deploying the dictionary weight matrix, the index matrix, and the coefficient matrix to a second electronic device without deploying the weight matrix to the second electronic device. A number of parameters in the dictionary weight matrix, the index matrix, and the coefficient matrix is smaller than a number of parameters in the weight matrix.

20 Claims, 8 Drawing Sheets

(56) References Cited

U.S. PATENT DOCUMENTS

| | | |
|---|---|---|
| 11,386,326 B2 | 7/2022 | Lin et al. |
| 2019/0156248 A1 | 5/2019 | Togashi |
| 2019/0378015 A1 | 12/2019 | Lin et al. |
| 2021/0255862 A1 | 8/2021 | Volkovs et al. |
| 2022/0076112 A1 | 3/2022 | Wagner et al. |
| 2022/0198254 A1 | 6/2022 | Dalli et al. |

OTHER PUBLICATIONS

Lagunas et al, "Block Pruning For Faster Transformers", Sep. 10, 2021, arXiv:2109.04838v1 [cs.LG] (11 Pages) (Year: 2021).*
Ravishankar, "Magnetic Resonance Image Reconstruction From Highly Undersampled K-Space Data Using Dictionary Learning," 2010, University of Illinois at Urbana-Champaign (85 Pages) (Year: 2010).*
Merity et al., "Pointer Sentinel Mixture Models," arXiv:1609.07843v1 [cs.CL], Sep. 2016, 13 pages.
Ott et al., "FAIRSEQ: A Fast, Extensible Toolkit for Sequence Modeling," arXiv:1904.01038v1, Apr. 2019, 6 pages.
Prato et al., "Fully Quantized Transformer for Machine Translation," arXiv:1910.10485v3, Mar. 2020, 13 pages.
Raffel et al., "Exploring the Limits of Transfer Learning with a Unified Text-to-Text Transformer," Journal of Machine Learning Research 21, Jun. 2020, 67 pages.
Reid et al., "Subformer: Exploring Weight Sharing for Parameter Efficiency in Generative Transformers," arXiv:2101.00234v3, Sep. 2021, 10 pages.
So et al., "The Evolved Transformer," arXiv:1901.11117v4, May 2019, 14 pages.
Takase et al., "Lessons on Parameter Sharing across Layers in Transformers," arXiv:2104.06022v3, Apr. 2022, 11 pages.
Vaswani et al., "Attention Is All You Need," 31st Conference on Neural Information Processing Systems (NIPS 2017), Dec. 2017, 11 pages.
Xia et al., "Tied Transformers: Neural Machine Translation with Shared Encoder and Decoder," The Thirty-Third AAAI Conference on Artificial Intelligence (AAAI-19), Jul. 2019, 8 pages.
Zhou et al., "Informer: Beyond Efficient Transformer for Long Sequence Time-Series Forecasting," The Thirty-Fifth AAAI Conference on Artificial Intelligence (AAAI-21), Mar. 2021, 10 pages.
Lou et al., "DictFormer: Tiny Transformer with Shared Dictionary," ICLR, 2022, 16 pages.
Tariyal et al., "Deep Dictionary Learning," IEEE Access, 2016, 14 pages.
Noach et al., "Compressing Pre-trained Language Models by Matrix Decomposition," Proceedings of the 1st Conference of the Asia-Pacific Chapter of the Association for Computational Linguistics and the 10th International Joint Conference on Natural Language Processing, Dec. 2020, 6 pages.
Mao et al., "LadaBERT: Lightweight Adaptation of BERT through Hybrid Model Compression," Proceedings of the 28th International Conference on Computational Linguistic, Dec. 2020, 10 pages.
Maalouf et al., "Deep Learning Meets Projective Clustering," ICLR, 2021, 20 pages.
Kamath et al., "MDETR—Modulated Detection for End-to-End Multi-Modal Understanding," arXiv:2104.12763v1, Apr. 2021, 21 pages.
Radford et al., "Learning Transferable Visual Models From Natural Language Supervision," arXiv:2103.00020v1, Feb. 2021, 48 pages.
Argueta et al., "Accelerating Sparse Matrix Operations in Neural Networks on Graphics Processing Units," Proceedings of the 57th Annual Meeting of the Association for Computational Linguistics, Jul. 2019, 10 pages.
Carion et al., "End-to-End Object Detection with Transformers," arXiv:2005.12872v3, May 2020, 26 pages.
Chen et al., "UNITER: Universal Image-Text Representation Learning," arXiv:1909.11740v3, Jul. 2020, 26 pages.
Choo et al., "Understanding and Optimizing GPU Cache Memory Performance for Compute Workloads," 13th International Symposium on Parallel and Distributed Computing, 2014, 8 pages.
Dai et al., "Dynamic DETR: End-to-End Object Detection with Dynamic Attention," 2021 IEEE/CVF International Conference on Computer Vision (ICCV), 2021, 10 pages.
Dai et al., "UP-DETR: Unsupervised Pre-training for Object Detection with Transformers," arXiv:2011.09094v2, Apr. 2021, 11 pages.
Deng et al., "TransVG: End-to-End Visual Grounding with Transformers," arXiv:2104.08541v1, Apr. 2021, 10 pages.
Gan et al., "Large-Scale Adversarial Training for Vision-and-Language Representation Learning," arXiv:2006.06195v2, Oct. 2020, 16 pages.
Golub et al., "Handbook Series Linear Albegra: Singular Value Decomposition and Least Squares Solutions," Numer. Math., 1970, 18 pages.
Hudson et al., "GQA: A New Dataset for Real-World Visual Reasoning and Compositional Question Answering," arXiv:1902.09506v2, Apr. 2019, 19 pages.
Jiao et al., "TinyBERT: Distilling BERT for Natural Language Understanding," arXiv:1909.10351v5, Oct. 2020, 12 pages.
Kazemzadeh et al., "ReferItGame: Referring to Objects in Photographs of Natural Scenes," Proceedings of the 2014 Conference on Empirical Methods in Natural Language Processing (EMNLP), Oct. 2014, 12 pages.
Khudia et al., "FBGEMM: Enabling High-Performance Low-Precision Deep Learning Inference," arXiv:2101.05615v1, Jan. 2021, 5 pages.
Kim et al., "ViLT: Vision-and-Language Transformer Without Convolution or Region Supervision," arXiv:2102.03334v1, Feb. 2021, 11 pages.
Krishna et al., "Visual Genome, Connecting Language and Vision Using Crowdsourced Dense Image Annotations," arXiv:1602.07332v1, Feb. 2016, 44 pages.
Li et al., "What Does BERT with Vision Look At," Proceedings of the 58th Annual Meeting of the Association for Computational Linguistics, Jul. 2020, 11 pages.
Li et al., "Referring Transformer: A One-step Approach to Multi-task Visual Grounding," arXiv:2106.03089v1, Jun. 2021, 13 pages.
Liu et al., "Progressive Neural Architecture Search," arXiv:1712.00559v3, Jul. 2018, 20 pages.
Liu et al., "ROBERTa: A Robustly Optimized BERT Pretraining Approach," arXiv:1907.11692v1, Jul. 2019, 13 pages.
Lu et al., "ViLBERT: Pretraining Task-Agnostic Visiolinguistic Representations for Vision-and-Language Tasks," arXiv:1908.02265v1, Aug. 2019, 11 pages.
Paszke et al., "PyTorch: An Imperative Style, High-Performance Deep Learning Library," 33rd Conference on Neural Information Processing Systems (NeurIPS 2019), 2019, 12 pages.
Plummer et al., "Flickr30k Entities: Collecting Region-to-Phrase Correspondences for Richer Image-to-Sentence Models," arXiv:1505.04870v4, Sep. 2016, 22 pages.
Sanh et al., "DistilBERT, a distilled version of BERT: smaller, faster, cheaper and lighter," arXiv:1910.01108v4, Mar. 2020, 5 pages.
Sun et al., "Patient Knowledge Distillation for BERT Model Compression," arXiv:1908.09355v1, Aug. 2019, 10 pages.
Sun et al., "Rethinking Transformer-based Set Prediction for Object Detection," arXiv:2011.10881v1, Nov. 2020, 13 pages.
Tan et al., "EfficientNet: Rethinking Model Scaling for Convolutional Neural Networks," arXiv:1905.11946v5, Sep. 2020, 11 pages.
Wang et al., "MINILM: Deep Self-Attention Distillation for Task-Agnostic Compression of Pre-Trained Transformers," arXiv:2002.10957v2, Apr. 2020, 15 pages.
Wu et al., "PhraseCut: Language-based Image Segmentation in the Wild," arXiv:2008.01187v1, Aug. 2020, 17 pages.
Wu et al., "Lite Transformer with Long-Short Range Attention," arXiv:2004.11886v1, Apr. 2020, 13 pages.
Yang et al., "TAP: Text-Aware Pre-training for Text-VQA and Text-Caption," arXiv:2012.04638v1, Dec. 2020, 14 pages.
Yu et al., "Modeling Context in Referring Expressions," arXiv:1608.00272v3, Aug. 2016, 19 pages.

(56) References Cited

OTHER PUBLICATIONS

Zhu et al., "Deformable DETR: Deformable Transformers for End-To-End Object Detection," arXiv:2010.04159v4, Mar. 2021, 16 pages.
Lan et al., "ALBERT: A Lite BERT for Self-supervised Learning of Language Representations," Eighth International Conference on Learning Representations, Feb. 2020, 17 pages.
Wu et al., "Lite Transformer with Long-Short Range Attention," Eighth International Conference on Learning Representations, Apr. 2020, 13 pages.
Baevski et al., "Adaptive Input Representations for Neural Language Modeling," arXiv:1809.10853v3, Feb. 2019, 13 pages.
Behnke et al., "Losing Heads in the Lottery: Pruning Transformer Attention in Neural Machine Translation," Proceedings of the 2020 Conference on Empirical Methods in Natural Language Processing, Nov. 2020, 11 pages.
Brown et al., "Language Models are Few-Shot Learners," 34th Conference on Neural Information Processing Systems (NeurIPS 2020), Jul. 2020, 25 pages.
Chen et al., "A Thorough Examination of the CNN/Daily Mail Reading Comprehension Task," arXiv:1606.02858v2, Aug. 2016, 11 pages.
Dehghani et al., "Universal Transformers," arXiv:1807.03819v3, Mar. 2019, 23 pages.
Katharopoulos et al., "Transformers are RNNs: Fast Autoregressive Transformers with Linear Attention," arXiv:2006.16236v3, Aug. 2020, 17 pages.
Ma et al., "A Tensorized Transformer for Language Modeling," 33rd Conference on Neural Information Processing Systems (NeurIPS 2019), November 1029, 11 pages.
Mehta et al., "DeLight: Deep and Light-Weight Transformer," arXiv.2008.00623v2, Feb. 2021, 19 pages.
Merity et al., "Regularizing and Optimizing LSTM Language Models," arXiv:1708.02182v1, Aug. 2017, 10 pages.

\* cited by examiner

SMALL AND FAST TRANSFORMER MODEL FOR MULTI-MODAL OR OTHER TASKS

CROSS-REFERENCE TO RELATED APPLICATION AND PRIORITY CLAIM

This application claims priority under 35 U.S.C. § 119(e) to U.S. Provisional Patent Application No. 63/286,470 filed on Dec. 6, 2021. This provisional application is hereby incorporated by reference in its entirety.

TECHNICAL FIELD

This disclosure relates generally to machine learning systems. More specifically, this disclosure relates to a small and fast transformer model for multi-modal or other tasks.

BACKGROUND

Recent multi-modal detectors based on transformers and modality encoders have successfully achieved impressive results on end-to-end visual object detection conditioned on raw textual queries. In other words, these types of detectors are able to perform visual object detection within images to support textual queries, such as when these types of detectors can identify which images contain objects satisfying the textual queries. However, these types of detectors typically require large model sizes and enormous amounts of computations to achieve high performance. This typically makes it difficult or impossible to deploy these types of detectors onto mobile electronic devices or other electronic devices that are more limited in terms of processing and memory resources.

SUMMARY

This disclosure relates to a small and fast transformer model for multi-modal or other tasks.

In a first embodiment, a method includes obtaining, using at least one processing device of a first electronic device, a weight matrix associated with a trained transformer model. The method also includes factorizing, using the at least one processing device, the weight matrix into a dictionary weight matrix and an intermediate matrix. The method further includes pruning, using the at least one processing device, the intermediate matrix to generate a sparse intermediate matrix. The method also includes fine-tuning, using the at least one processing device, the sparse intermediate matrix based on a training dataset to generate a fine-tuned sparse intermediate matrix. The method further includes determining, using the at least one processing device, an index matrix and a coefficient matrix based on the fine-tuned sparse intermediate matrix. In addition, the method includes deploying the dictionary weight matrix, the index matrix, and the coefficient matrix to a second electronic device without deploying the weight matrix to the second electronic device. A number of parameters in the dictionary weight matrix, the index matrix, and the coefficient matrix is smaller than a number of parameters in the weight matrix.

In a second embodiment, an apparatus includes at least one processing device configured to obtain a weight matrix associated with a trained transformer model, factorize the weight matrix into a dictionary weight matrix and an intermediate matrix, prune the intermediate matrix to generate a sparse intermediate matrix, and fine-tune the sparse intermediate matrix based on a training dataset to generate a fine-tuned sparse intermediate matrix. The at least one processing device is also configured to determine an index matrix and a coefficient matrix based on the fine-tuned sparse intermediate matrix and deploy the dictionary weight matrix, the index matrix, and the coefficient matrix to an electronic device without deploying the weight matrix to the electronic device. A number of parameters in the dictionary weight matrix, the index matrix, and the coefficient matrix is smaller than a number of parameters in the weight matrix.

In a third embodiment, a method includes obtaining, by an electronic device that stores a trained machine learning model, an input. The trained machine learning model includes a dictionary weight matrix, an index matrix, and a coefficient matrix. The method also includes determining, using the electronic device, an output corresponding to the input by performing a linear combination using the dictionary weight matrix, the index matrix, and the coefficient matrix. Performing the linear combination includes generating a dictionary based on a product of the input and the dictionary weight matrix and, for each of one or more columns of the output, determining a weighted combination of columns in the dictionary. The columns in the dictionary are selected based on the index matrix, and weights applied to the selected columns in the dictionary are selected based on the coefficient matrix.

In a fourth embodiment, an apparatus includes at least one memory configured to store a trained machine learning model, where the trained machine learning model includes a dictionary weight matrix, an index matrix, and a coefficient matrix. The apparatus also includes at least one processing device configured to obtain an input and perform a linear combination using the dictionary weight matrix, the index matrix, and the coefficient matrix to determine an output corresponding to the input. To perform the linear combination, the at least one processing device is configured to generate a dictionary based on a product of the input and the dictionary weight matrix and, for each of one or more columns of the output, determine a weighted combination of columns in the dictionary. The at least one processing device is configured to select the columns in the dictionary based on the index matrix, and the at least one processing device is configured to select weights applied to the selected columns in the dictionary based on the coefficient matrix.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
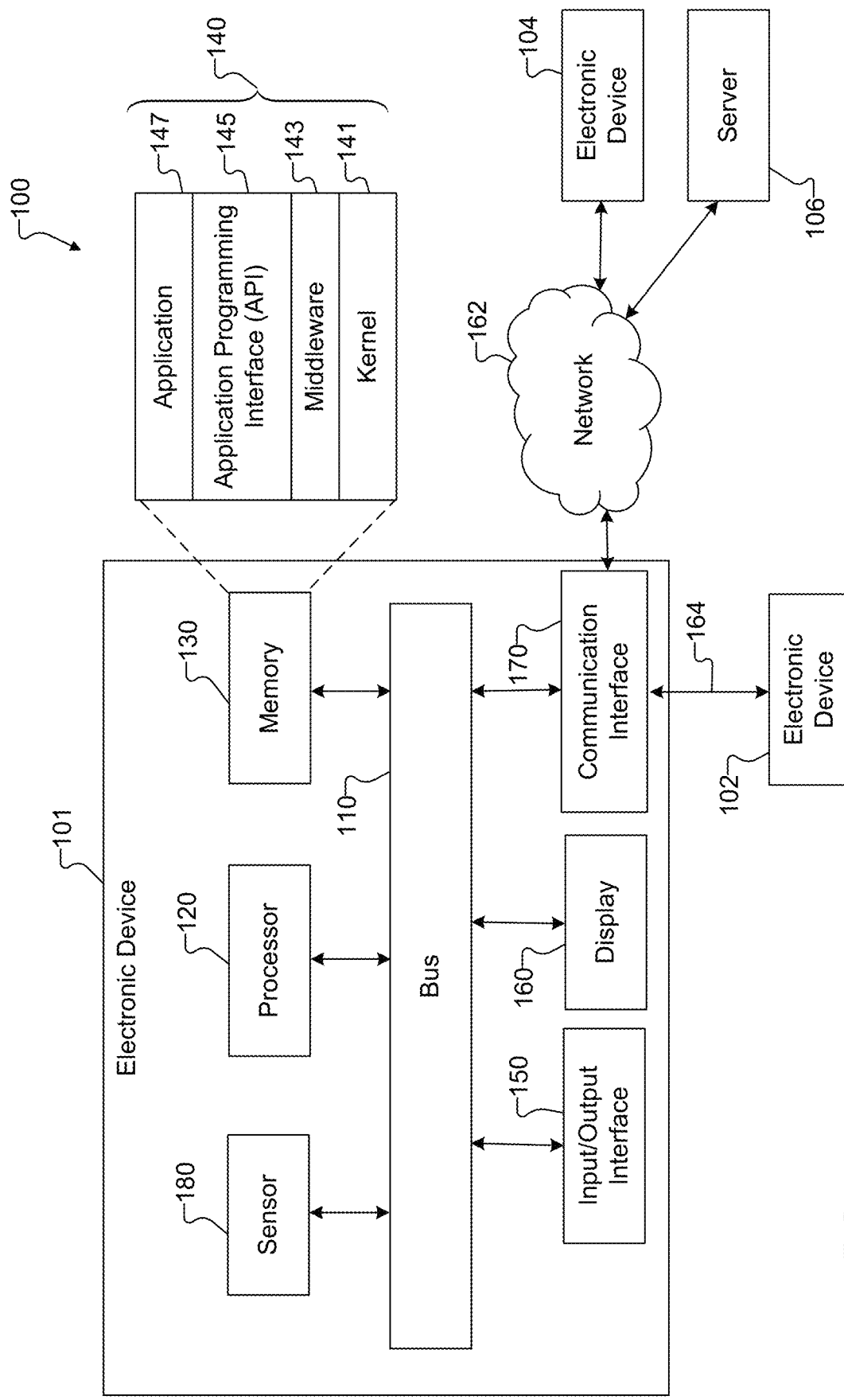
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, recent multi-modal detectors based on transformers and modality encoders have successfully achieved impressive results on end-to-end visual object detection conditioned on raw textual queries. In other words, these types of detectors are able to perform visual object detection within images to support textual queries, such as when these types of detectors can identify which images contain objects satisfying the textual queries. However, these types of detectors typically require large model sizes and enormous amounts of computations to achieve high performance. This typically makes it difficult or impossible to deploy these types of detectors onto mobile electronic devices or other electronic devices that are more limited in terms of processing and memory resources. Techniques for compressing machine learning models, such as factorization or singular value decomposition (SVD), often result in significant decreases in machine learning model accuracy.

This disclosure provides various implementations of a small and fast transformer model for multi-modal or other tasks. As described in more detail below, a dictionary lookup transformation (DLT) can be designed and used in place of a linear transformation in multi-modal detectors or other machine learning models. A weight matrix in a linear transformation can be approximately factorized into a smaller dictionary weight matrix, an index matrix, and a coefficient matrix. For example, a weight matrix associated with a trained transformer model can be obtained and factorized into a dictionary weight matrix and an intermediate matrix. The intermediate matrix can be pruned to generate a sparse intermediate matrix, and fine-tuning of the sparse intermediate matrix can be performed based on a training dataset to generate a fine-tuned sparse intermediate matrix. The index matrix and the coefficient matrix can be determined based on the fine-tuned sparse intermediate matrix, and the dictionary weight matrix, the index matrix, and the coefficient matrix can be deployed (such as to one or more end-user devices) without deploying the weight matrix. A number of parameters in the dictionary weight matrix, the index matrix, and the coefficient matrix is smaller than a number of parameters in the weight matrix.

Once deployed, the dictionary lookup transformation implemented using the dictionary weight matrix, the index matrix, and the coefficient matrix can be used as part of a trained machine learning model. For example, an electronic device (such as an end-user device) can store a trained machine learning model, where the trained machine learning model includes the dictionary weight matrix, the index matrix, and the coefficient matrix. The electronic device can receive an input and determine an output corresponding to the input using the trained machine learning model. The output can be determined by performing a linear combination of the input using the dictionary weight matrix, the index matrix, and the coefficient matrix. Performing the linear combination may include generating a dictionary based on a product of the input and the dictionary weight matrix and, for each of multiple columns of the output, determining a weighted combination of columns in the dictionary. The columns in the dictionary can be selected based on the index matrix, and weights applied to the selected columns in the dictionary can be selected based on the coefficient matrix.

In this way, a linear projection with weights (which is typically large in terms of computations and memory requirements) can be converted into a more efficient linear combination using a dictionary, a limited number of dictionary lookups, and scaling via the indices and coefficients. This provides a good trade-off between model accuracy and model size without requiring expensive model re-training. In some cases, for instance, one or more dictionary lookup transformations can achieve similar accuracy as conventional designs while reducing the size of the resulting machine learning model by up to a factor of four or even more. Moreover, these approaches can be applied to any trained multi-modal detector, which removes the need to perform expensive model training from scratch. Further, the index and coefficient matrices can be generated using a sparse matrix that is trained during fine-tuning and converted into the index and coefficient matrices, which helps to tackle the problem of training a dictionary lookup transformation due to the presence of a non-differentiable index. In addition, these approaches can be used to design dictionary lookup transformations that support end-to-end multi-modal understanding on mobile devices or other resource-constrained devices by significantly reducing model sizes while maintaining model accuracies.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to process input data using a trained machine learning model and produce output data, where the trained machine learning model includes a dictionary weight matrix, an index matrix, and a coefficient matrix.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for processing input data using a trained machine learning model and producing output data. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th Generation (5G) wireless system, millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to obtain a weight matrix associated with a trained transformer model and process the weight matrix to produce a dictionary weight matrix, an index matrix, and a coefficient matrix. The server 106 may also be used to deploy the dictionary weight matrix, the index matrix, and the coefficient matrix to one or more electronic devices, such as the electronic device 101 (typically without deploying the original weight matrix).

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
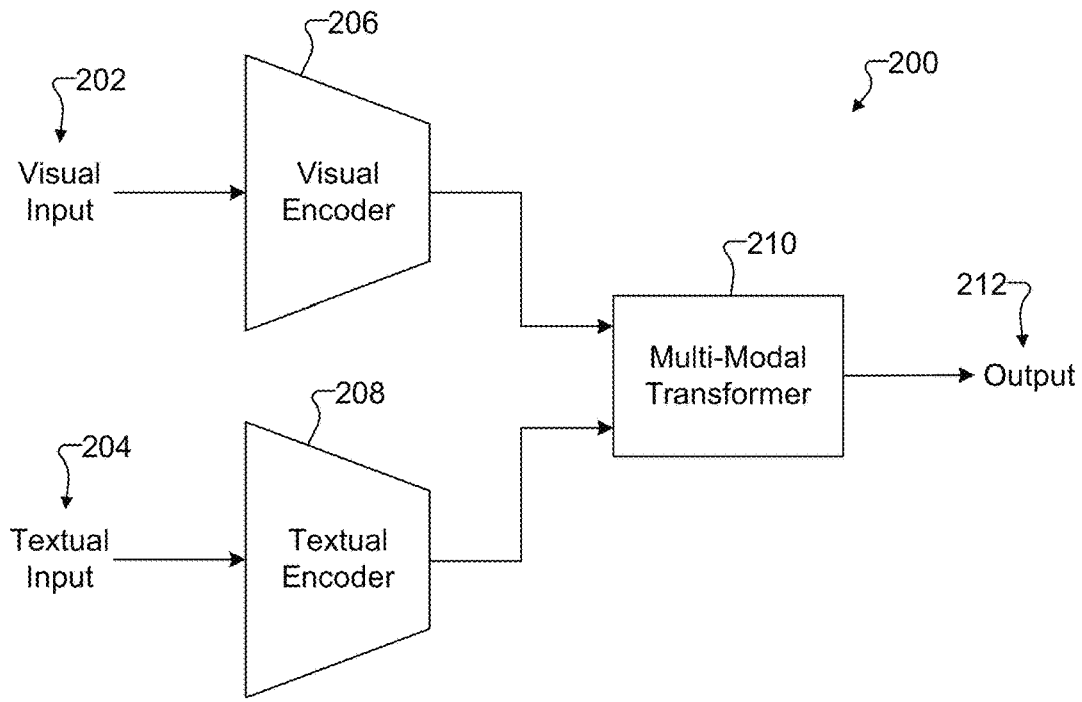
FIG. 2 illustrates an example architecture that uses a small and fast transformer model for multi-modal or other tasks in accordance with this disclosure.

FIG. 2 illustrates an example architecture 200 that uses a small and fast transformer model for multi-modal or other tasks in accordance with this disclosure. For ease of explanation, the architecture 200 shown in FIG. 2 is described as being generated by the server 106 and deployed to the electronic device 101 for use in the network configuration 100 of FIG. 1. However, the architecture 200 shown in FIG. 2 could be generated and/or used by any other suitable device(s) and in any other suitable system(s).

As shown in FIG. 2, the architecture 200 receives and processes visual input 202 and textual input 204. The visual input 202 may represent images or other information defining visual content, such as still images or video sequences. The textual input 204 may represent textual queries or other information defining textual content. In some embodiments, the visual input 202 can represent images containing objects, such as people, items on/near/around the people, or other objects captured in scenes. Also, in some embodiments, the textual input 204 can include text associated with at least one object in at least one of the images. In these embodiments, the architecture 200 can be used to identify the at least one object in the image(s) based on the text, such as to support functions like visual question answering. The visual input 202 and textual input 204 can each be obtained from any suitable source(s) and in any suitable manner.

The visual input 202 is provided to a visual encoder 206, which generally operates to extract features of the visual input 202. For example, the visual encoder 206 may represent at least a portion of a machine learning model that has been trained to determine features of the visual input 202 that are relevant to the specific task(s) for which the machine learning model has been trained, and the visual encoder 206 can extract the features from specific visual input 202. The visual encoder 206 includes any suitable machine learning-based structure or other logic used to extract features from visual input 202, such as one or more convolutional neural network (CNN) layers. As a particular example, the visual encoder 206 may be implemented using a Tiny Vision encoder.

The textual input 204 is provided to a textual encoder 208, which generally operates to extract features of the textual input 204. For example, the textual encoder 208 may represent at least a portion of a machine learning model that has been trained to determine features of the textual input 204 that are relevant to the specific task(s) for which the machine learning model has been trained, and the textual encoder 208 can extract the features from specific textual input 204. The textual encoder 208 includes any suitable machine learning-based structure or other logic used to extract features from textual input 204. In some cases, the textual encoder 208 may be implemented using a dictionary lookup transformation (DLT)-based transformer. Example embodiments of a DLT-based transformer are provided below.

The features extracted by the visual encoder 206 and the textual encoder 208 are provided to a multi-modal transformer 210, which generally operates to process the extracted features and generate at least one output 212 corresponding to or based on the visual input 202 and the textual input 204. For example, the multi-modal transformer 210 may represent at least a portion of a machine learning model that has been trained to process features of multiple types of data (visual and textual in this example) and generate output 212 based on those features. The multi-modal transformer 210 is referred to as "multi-modal" since the multi-modal transformer 210 can process features of both visual input 202 and textual input 204. The multi-modal transformer 210 includes any suitable machine learning-based structure used to process multi-modal features. In some cases, the multi-modal transformer 210 may be implemented using a DLT-based transformer. Again, example embodiments of a DLT-based transformer are provided below.

As noted above, in some embodiments, the textual input 204 can include text associated with at least one object in at least one of the images contained in the visual input 202. In these embodiments, the visual encoder 206 can generate features of the visual input 202, and the textual encoder 208 can generate features of the textual input 204. The multi-modal transformer 210 can process these features in order to identify the at least one object in the image(s) based on the text. As an example, the visual input 202 may include a number of images, including a specified image of a person wearing a red jersey and carrying a baseball bat. If the textual input 204 includes a user query of "the man in the red shirt carrying baseball bats," the multi-modal transformer 210 can process the features and determine that the specified image matches the user's query, and the multi-modal transformer 210 can output the specified image or perform one or more additional functions using the specified image. Note that this example usage of the architecture 200 is for illustration only and that the architecture 200 may be used in any other suitable manner.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an architecture 200 that uses a small and fast transformer model for multi-modal or other tasks, various changes may be made to FIG. 2. For example, various components shown in FIG. 2 can be added, omitted, combined, further subdivided, replicated, or placed in any other suitable configuration according to particular needs. Also, at least one dictionary lookup transformation may be used in any other suitable architecture or environment.

Figure 3A:
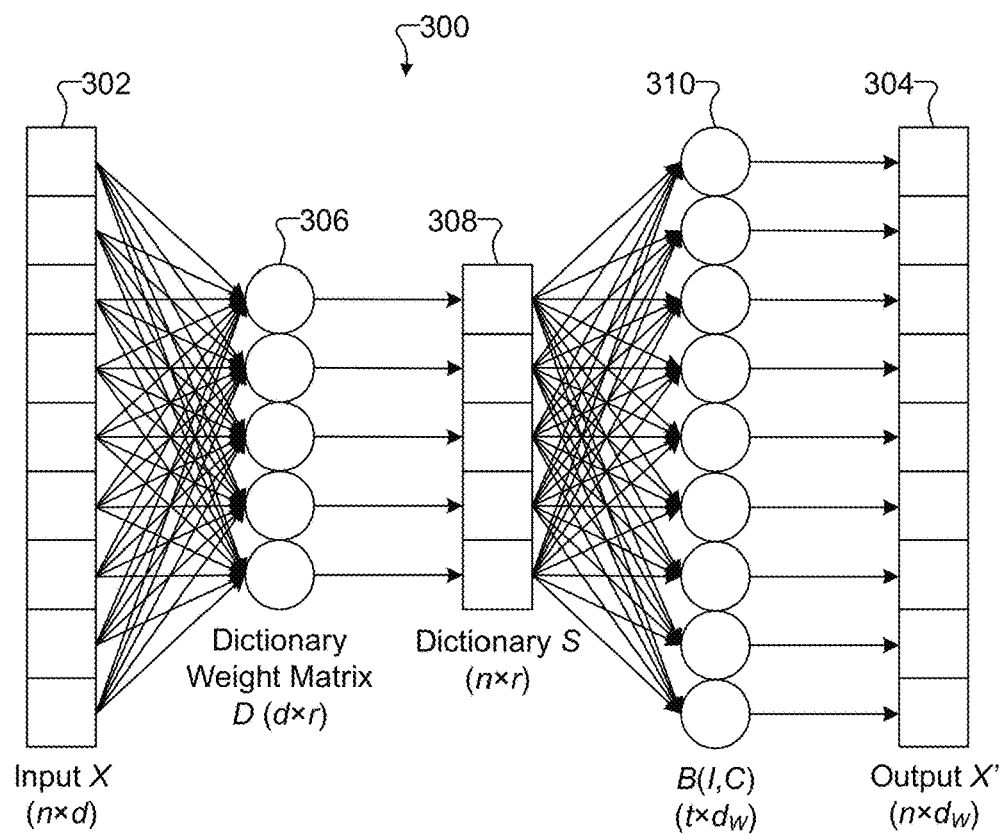
FIGS. 3A and 3B illustrate an example dictionary lookup transformation and an associated small and fast transformer model for multi-modal or other tasks in accordance with this disclosure.
Figure 3B:
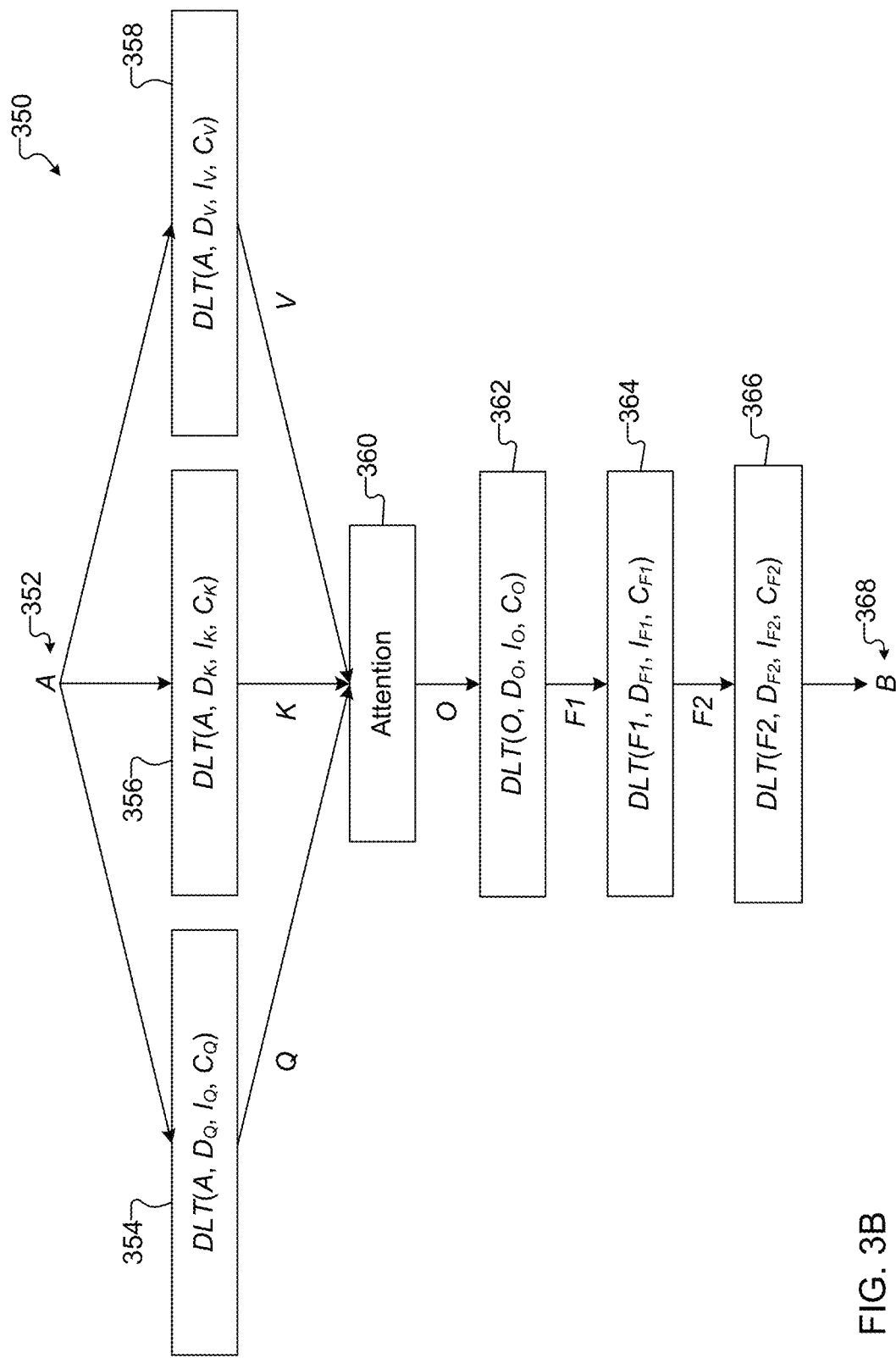

FIGS. 3A and 3B illustrate an example dictionary lookup transformation 300 and an associated small and fast transformer model 350 for multi-modal or other tasks in accordance with this disclosure. The dictionary lookup transformation 300 and the transformer model 350 can be used to implement a DLT-based transformer. For ease of explanation, the dictionary lookup transformation 300 and the transformer model 350 shown in FIGS. 3A and 3B are described as being generated by the server 106 and deployed to the electronic device 101 for use in the network configuration 100 of FIG. 1. As a particular example, at least one instance of the dictionary lookup transformation 300 or the transformer model 350 may be used to implement the textual encoder 208, the multi-modal transformer 210, or both in the architecture 200 of FIG. 2. However, the dictionary lookup transformation 300 and the transformer model 350 could be generated and/or used by any other suitable device(s) and in any other suitable system(s).

During a standard linear transformation operation in a machine learning model, input having dimensions of n×d is multiplied by weights in a weight matrix having dimensions of $d \times d_W$, and the results are summed to produce output having dimensions of $n \times d_W$. This type of linear transformation (LT) operation may be denoted as X'=LT(X, W), where X represents the input, W represents the weights, and X' represents the output. This type of linear transformation operation can be computationally complex and require a relatively large amount of memory space, particularly when the input takes the form of large vectors or matrices.

As shown in FIG. 3A, it is possible to convert a standard linear transformation operation into a dictionary lookup transformation 300 that is less computationally complex and that uses a smaller amount of memory. In this example, the dictionary lookup transformation 300 receives input 302 and generates corresponding output 304. As can be seen in this example, the input 302 is multiplied by weights in a dictionary weight matrix (D) 306, and the resulting products are summed to produce values in a dictionary 308. The dictionary weight matrix 306 has dimensions of d×r, and the resulting dictionary 308 has dimensions of n×r (where $r < d_W$). Note that $d_W$ here represents one dimension of the original weight matrix. Effectively, this approach compresses the input 302 into a smaller dictionary 308 that can be processed more quickly and easily compared to conventional linear transformation approaches.

Figure 4A:
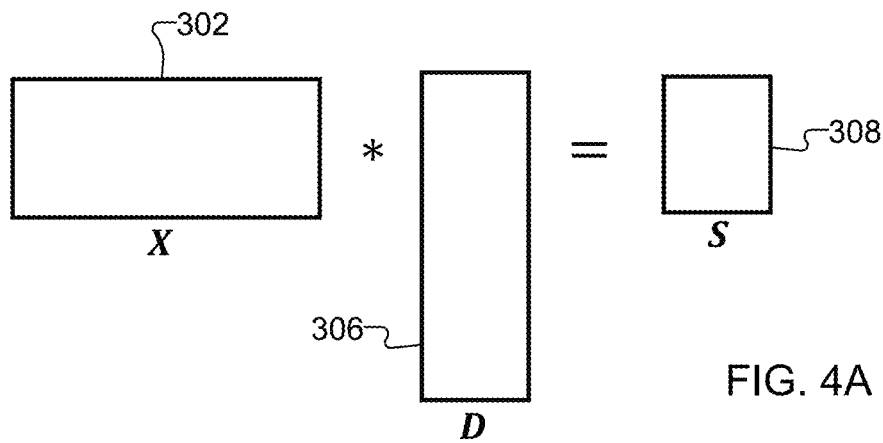
FIGS. 4A through 4C illustrate example operations performed using a dictionary lookup transformation in accordance with this disclosure.
Figure 4B:
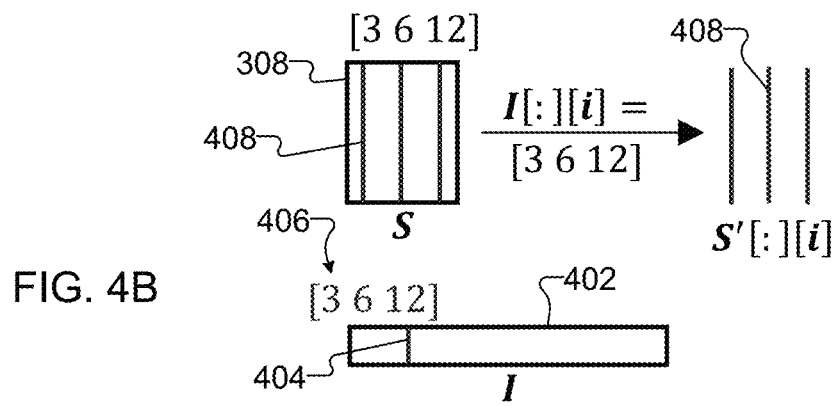
Figure 4C:
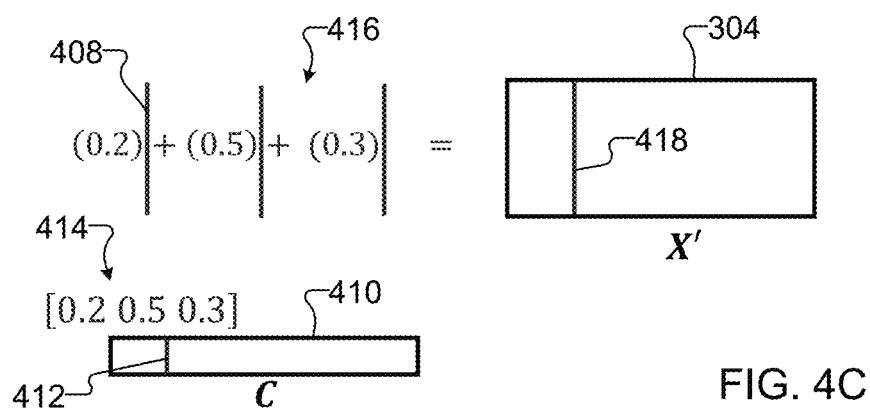

The dictionary 308 is used to produce the output 304 corresponding to the input 302. More specifically, each of one or more columns contained in the output 304 can represent a linear combination of t columns from the dictionary 308. This linear combination is determined using an index matrix (I) and a coefficient matrix (C). The index matrix is used to select specific columns from the dictionary 308, and the coefficient matrix contains weights that are applied to those specific columns from the dictionary 308 when the linear combination is determined. In this example, for reasons discussed below, the index matrix and the coefficient matrix are represented as an intermediate matrix (B) 310. The operation of the dictionary lookup transformation 300 may be denoted as X'=DLT(X, D, I, C), where X represents the input and D, I, and C respectively represent the dictionary weight matrix 306, the index matrix, and the coefficient matrix. Example operations performed by the dictionary lookup transformation 300 are shown in FIGS. 4A through 4C, which are described below.

As shown in FIG. 3B, the small and fast transformer model 350 operates to receive input 352, which (depending on the position of the transformer model 350 within a pipeline) may represent the input 302 or hidden states from a previous layer of a machine learning model. The input 352 is processed using dictionary lookup transformations 354, 356, and 358 to respectively generate a query Q, a key K, and a value V (which are vectors). Each of the dictionary lookup transformations 354, 356, and 358 can use a suitable dictionary weight matrix, a suitable index matrix, and a suitable coefficient matrix to generate the query, key, or value. An attention function 360 can map queries and key-value pairs to outputs O (each one a vector). In some cases, the operation of the attention function 360 can be described as follows.

$$\text{Attention}(Q, K, V) = \text{softmax}\left(\frac{QK^T}{\sqrt{d}}V\right)$$

The variable d here represents the dimension of the query, key, and value vectors. To combine multi-head information, the outputs O are projected using a dictionary lookup transformation 362, which can use a suitable dictionary weight matrix, a suitable index matrix, and a suitable coefficient matrix, to produce projected values F1. The projected values F1 are processed using a feedforward network (FFN) formed by dictionary lookup transformations 364 and 366, each of which can use a suitable dictionary weight matrix, a suitable index matrix, and a suitable coefficient matrix. The dictionary lookup transformation 364 generates projected values F2, and the dictionary lookup transformation 366 generates the next hidden state or output 368. In some cases, the operation of the dictionary lookup transformations 364 and 366 can be described as follows.

$$FFN(F1)=\max(0, F1W_{F1}+b_{F1})W_{F2}+b_{F2}$$

Here, $W_{F1}$ and $W_{F2}$ represent projections, and $b_{F1}$ and $b_{F2}$ represent biases.

It should be noted that the functions shown in or described with respect to each of FIGS. 3A and 3B can be implemented in an electronic device 101, server 106, or other device(s) in any suitable manner. For example, in some embodiments, at least some of the functions shown in or described with respect to each of FIGS. 3A and 3B can be implemented or supported using one or more software applications or other software instructions that are executed by the processor 120 of the electronic device 101, server 106, or other device(s). In other embodiments, at least some of the functions shown in or described with respect to each of FIGS. 3A and 3B can be implemented or supported using dedicated hardware components. In general, the functions shown in or described with respect to each of FIGS. 3A and 3B can be performed using any suitable hardware or any suitable combination of hardware and software/firmware instructions.

Although FIGS. 3A and 3B illustrate examples of a dictionary lookup transformation 300 and an associated small and fast transformer model 350 for multi-modal or other tasks, various changes may be made to FIGS. 3A and 3B. For example, the number of entries in the input 302, output 304, dictionary weight matrix 306, dictionary 308, and intermediate matrix 310 are examples only and can vary as needed or desired. Also, the dictionary lookup transformation 300 may be used in any suitable transformer model and may not be limited to the specific transformer model 350 shown in FIG. 3B.

FIGS. 4A through 4C illustrate example operations performed using a dictionary lookup transformation in accordance with this disclosure. For ease of explanation, the operations shown in FIGS. 4A through 4C are described as being performed using the dictionary lookup transformation 300 of FIG. 3A, which may be generated by the server 106 and deployed to the electronic device 101 for use in the network configuration 100 of FIG. 1. However, the operations shown in FIGS. 4A through 4C could be performed using any other suitable dictionary lookup transformations that are generated and/or used by any other suitable device(s) and in any other suitable system(s).

As shown in FIG. 4A, the input 302 is multiplied by the dictionary weight matrix 306 to generate the dictionary 308. In some cases, this may represent a small linear projection. This operation compresses the input 302 (which can have dimensions of n×d) using the dictionary weight matrix 306 (which can have dimensions of d×r) to produce a smaller dictionary 308 (which can have dimensions of n×r) since r<d.

As shown in FIG. 4B, a lookup operation is performed within the dictionary 308 based on an index matrix 402 (which can have dimensions of t×$d_W$). The index matrix 402 includes various entries 404 that contain index values 406, where the index values 406 identify specific columns 408 of the dictionary 308 to be used when generating the output 304. For example, each column of the index matrix 402 can store index values 406 that identify which columns 408 of the dictionary 308 should be selected for use in a weighted combination to generate one column of the output 304. In some cases, the selection of columns 408 from the dictionary 308 can be expressed as a lookup that is defined as follows.

$$S'[:][i]=\text{Lookup}(S,I[:][i])$$

Here, S represents the dictionary 308, I represents the index matrix 402, i represents the $i^{th}$ column of the index matrix 402, and S' represents the columns of the dictionary 308 extracted based on the $i^{th}$ column of the index matrix 402. As a particular example, if a weighted combination is performed for three columns 408 of the dictionary 308, the $i^{th}$ column in the index matrix 402 may identify columns three, six, and twelve in the dictionary 308. This particular example is shown in FIG. 4B, where the index matrix 402 is used to identify columns [3, 6, 12] in the dictionary 308.

As shown in FIG. 4C, another lookup operation is performed using a coefficient matrix 410 (which can have dimensions of t×$d_W$). The coefficient matrix 410 includes various entries 412 that identify the weights 414 to be applied to the specific columns 408 selected in the dictionary 308 to generate the output 304. For example, each column of the coefficient matrix 410 can store weights 414 to be applied to the selected columns 408 from the dictionary 308. As a particular example, if a weighted combination is performed for three columns 408 of the dictionary 308, the $i^{th}$ column in the coefficient matrix 410 may identify three weights 414 to be applied to the three selected columns 408

(columns three, six, and twelve) in the dictionary 308. This particular example is shown in FIG. 4C, where the coefficient matrix 410 is used to identify weights 414 of [0.2, 0.5, 0.3] to be applied to the third, sixth, and twelfth columns 408 in the dictionary 308. Scale and sum operations 416 can apply the identified weights 414 to the selected columns 408 from the dictionary 308 (scaling) and combine the resulting scaled columns (sum) to produce one column 418 in the output 304.

The above process can be repeated $d_W$ times in order to produce all columns 418 in the output 304. Ideally, the total number of parameters contained in the dictionary weight matrix 306, the index matrix 402, and the coefficient matrix 410 is smaller than the number of parameters contained in an original weight matrix used by an original linear transformation operation in an original transformer model. Moreover, the above process can use computationally-cheap memory lookup operations in place of more computationally-expensive matrix multiplication operations. As a result, this approach helps to provide reduced model sizes and reduced computational overheads compared to conventional linear transformation operations in transformer models. Note that it may also be possible to combine this approach with an orthogonal quantization technique (such as a sixteen-bit orthogonal quantization or other orthogonal quantization provided in PyTorch) without modification to achieve further reductions in model sizes.

Although FIGS. 4A through 4C illustrate examples of operations performed using a dictionary lookup transformation 300, various changes may be made to FIGS. 4A through 4C. For example, the dimensions of the various elements in FIGS. 4A through 4C are for illustration only and can vary as needed or desired. Similarly, the values shown here for the index values 406 and the weights 414 are examples only and can vary as needed or desired.

Figure 5A:
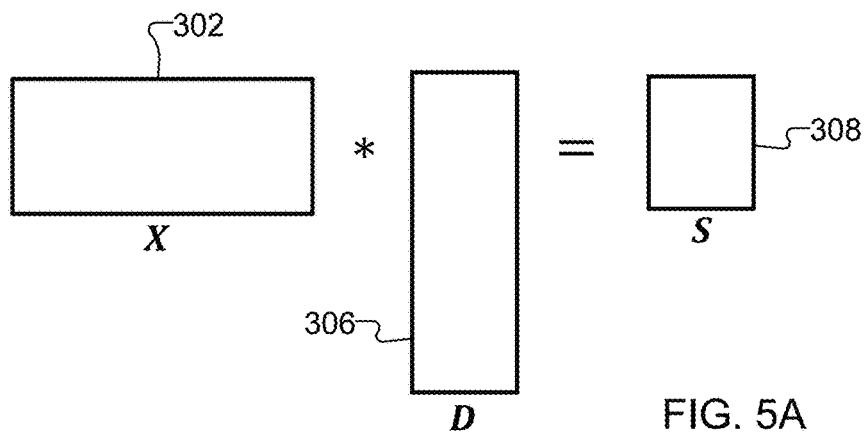
FIGS. 5A through 5C illustrate an example fine-tuning of a dictionary lookup transformation in accordance with this disclosure.
Figure 5B:
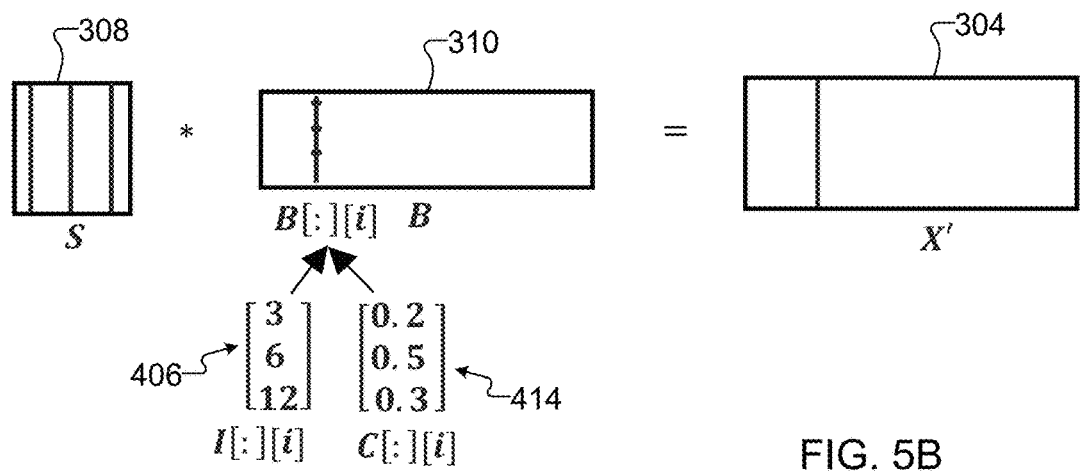
Figure 5C:
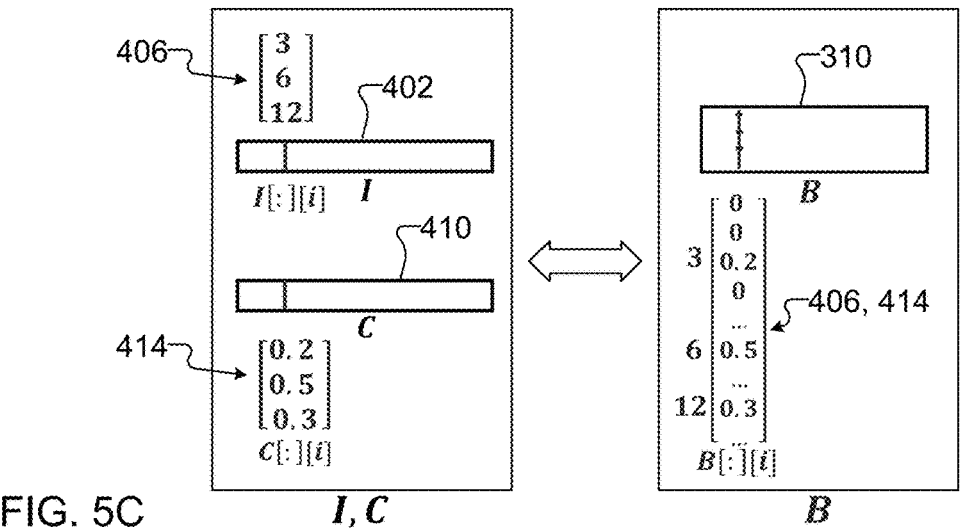

FIGS. 5A through 5C illustrate an example fine-tuning of a dictionary lookup transformation in accordance with this disclosure. For ease of explanation, the fine-tuning shown in FIGS. 5A through 5C is described as involving the dictionary lookup transformation 300 of FIG. 3, which may operate as shown in FIGS. 4A through 4C. However, the fine-tuning shown in FIGS. 5A through 5C could involve any other suitable dictionary lookup transformations.

In the example shown in FIGS. 4A through 4C, the index matrix 402 and the coefficient matrix 410 are shown as separate components, while an intermediate matrix 310 is shown in FIG. 3. This is because lookups into the dictionary 308 may not be differentiable since the index matrix 402 may include non-continuous index values. As a result, separate index and coefficient matrices 402 and 410 may be used during inferencing (after deployment) but may not be used during training. For example, the electronic device 101 may use separate index and coefficient matrices 402 and 410 when processing the input 302, but the server 106 may not use separate index and coefficient matrices 402 and 410 during training. Instead of using separate index and coefficient matrices 402 and 410 during training, the intermediate matrix 310 (which is differentiable) can be used with sparsity constraints during training. This allows for suitable training of the dictionary lookup transformation 300 and subsequent use of the trained dictionary lookup transformation 300 during inferencing.

As shown in FIG. 5A, the same general calculation is shown here as in FIG. 4A. However, the operations shown in FIG. 5A can occur during training, such as when the operations shown in FIG. 5A are performed by the server 106. As shown in FIG. 5B, the intermediate matrix 310 (which may represent a sparse matrix) can be trained to include both the index values 406 and the weights 414. This allows for simultaneous modifications to both the index values 406 and the weights 414 during training and avoids complications arising from the fact that the index matrix 402 may include non-continuous index values 406.

Once training is completed, the intermediate matrix 310 can be used to generate separate index and coefficient matrices 402 and 410. For example, FIG. 5C illustrates how the intermediate matrix 310 can be converted into the index matrix 402 and the coefficient matrix 410 (or vice versa). Here, given an index matrix 402 (I) and a coefficient matrix 410 (C) each with a size of $t \times d_W$, one can easily generate the intermediate matrix 310 (B) with a size of $r \times d_W$. In some embodiments, this can be done by assigning the values in indices of the index matrix 402 with corresponding coefficients and other values whose indices are not in the index matrix 402 as zeros. For example, given the $i^{th}$ column of the index matrix I[:][i]=[3, 6, 12] and the $i^{th}$ column of the coefficient matrix C[:][i]=[0.2, 0.5, 0.3], the third, sixth, and twelfth values of the corresponding intermediate matrix B[:][i] can be assigned 0.2, 0.5, and 0.3, respectively. The other values of B[:][i] can be assigned zeroes. Inversely, given the intermediate matrix B, one could easily extract the index matrix I and the coefficient matrix C.

Although FIGS. 5A through 5C illustrate one example of fine-tuning of a dictionary lookup transformation 300, various changes may be made to FIGS. 5A through 5C. For example, the dimensions of the various elements in FIGS. 5A through 5C are for illustration only and can vary as needed or desired. Similarly, the values shown here for the index values 406 and the weights 414 are examples only and can vary as needed or desired.

Figure 6:
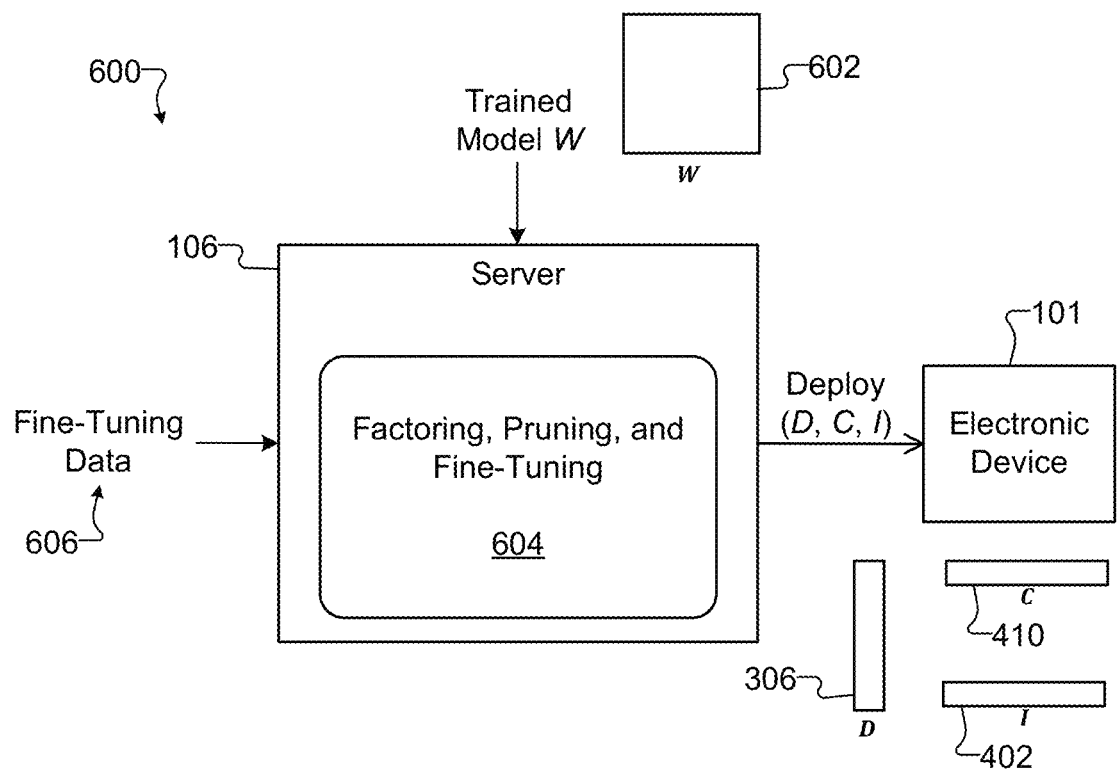
FIG. 6 illustrates an example system involved with a small and fast transformer model for multi-modal or other tasks during a training phase in accordance with this disclosure.
Figure 7:
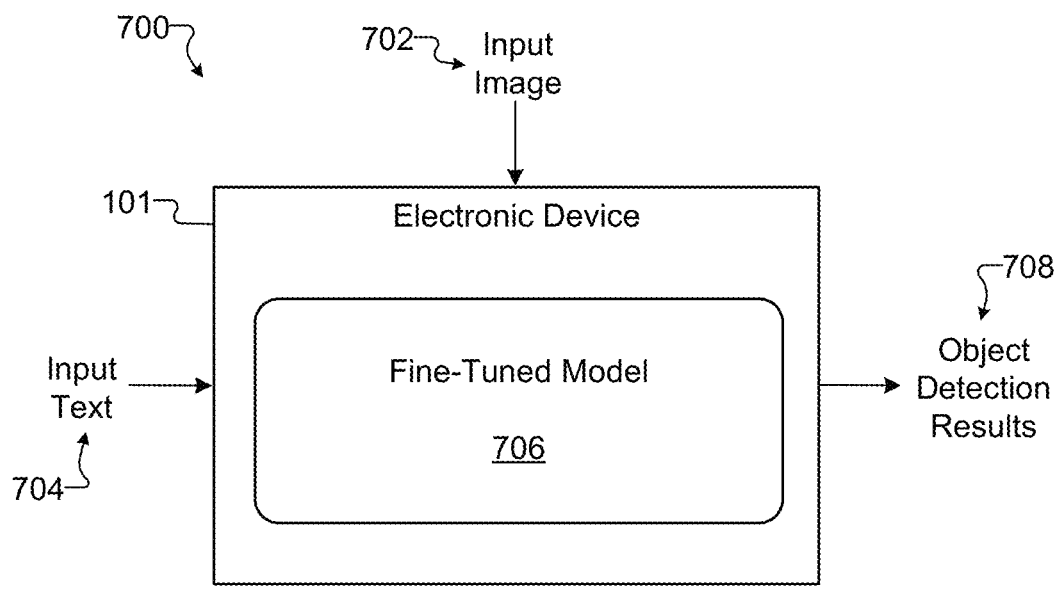
FIG. 7 illustrates an example system involved with a small and fast transformer model for multi-modal or other tasks during an inference phase in accordance with this disclosure.

FIG. 6 illustrates an example system 600 involved with a small and fast transformer model for multi-modal or other tasks during a training phase in accordance with this disclosure, and FIG. 7 illustrates an example system 700 involved with a small and fast transformer model for multi-modal or other tasks during an inference phase in accordance with this disclosure. For ease of explanation, the systems 600 and 700 shown in FIGS. 6 and 7 are described as involving the training and use of a dictionary lookup transformation 300 or a transformer model 350 shown in FIGS. 3A and 3B. However, the dictionary lookup transformation 300 and the transformer model 350 may be trained and used in any other suitable manner.

As shown in FIG. 6, during training, the server 106 obtains an original weight matrix (W) 602, which represents the weights used by a trained transformer model. In many instances, the trained transformer model can be trained using large amounts of processing power and training data (although this need not be the case). As described below, the server 106 can perform operations 604 to factorize the original weight matrix 602 and produce initial estimates of the dictionary weight matrix 306 and the intermediate matrix 310. This allows the knowledge gained during the training of the original transformer model to be substantially retained in the small and fast transformer model being produced. The server 106 can also perform the operations 604 to prune and fine-tune the initial estimate of the intermediate matrix 310 and to decompose the intermediate matrix 310 into the index matrix 402 and the coefficient matrix 410. Part of the fine-tuning can involve the use of fine-tuning data 606, which can represent a training dataset used during the fine-tuning. Once generated, the dictionary weight matrix 306, the index matrix 402, and the coefficient matrix 410 can be deployed, such as to one or more end-user devices (like the electronic device 101).

As shown in FIG. 7, during inferencing, the electronic device 101 receives one or more input images 702 and input text 704. The electronic device 101 employs a trained machine learning model 706, which can include the deployed dictionary weight matrix 306, index matrix 402, and coefficient matrix 410 from the server 106. The electronic device 101 uses the trained machine learning model 706 here to provide object detection results 708, which can be conditional based on the input text 704.

Although FIGS. 6 and 7 illustrate example systems 600 and 700 involved with a small and fast transformer model for multi-modal or other tasks during a training phase and during an inference phase, various changes may be made to FIGS. 6 and 7. For example, any other suitable device(s) may be used to perform training or inferencing. As a particular example, the same device may both train and use the machine learning model 706, or devices other than servers or end-user electronic devices may be used to train or use the machine learning model 706.

Figure 8:
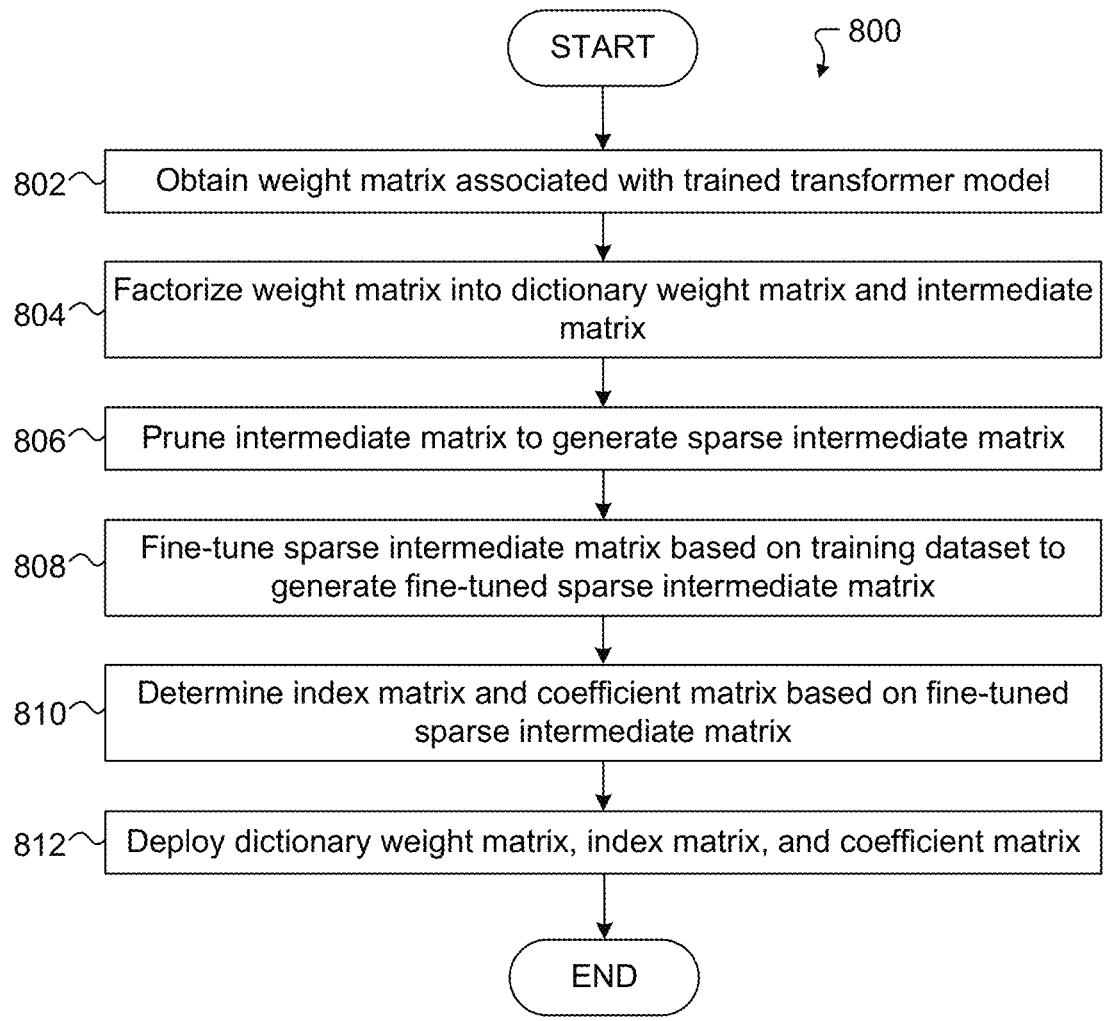
FIG. 8 illustrates an example method for training a small and fast transformer model for multi-modal or other tasks in accordance with this disclosure.

FIG. 8 illustrates an example method 800 for training a small and fast transformer model for multi-modal or other tasks in accordance with this disclosure. For ease of explanation, the method 800 shown in FIG. 8 is described as being performed using the server 106 in the network configuration 100 of FIG. 1. However, the method 800 shown in FIG. 8 could be performed using any other suitable device (such as the electronic device 101) and in any other suitable system.

As shown in FIG. 8, a weight matrix associated with a trained transformer model is obtained at step 802. This may include, for example, the processor 120 of the server 106 obtaining the original weight matrix 602 containing weights used by a trained transformer model. In some cases, the server 106 may itself train the transformer model and generate the original weight matrix 602. In other cases, the server 106 may obtain the original weight matrix 602 from another device or system (which may have trained the transformer model and generated the original weight matrix 602 or stored the original weight matrix 602).

The original weight matrix is factorized into a dictionary weight matrix and an intermediate matrix at step 804. This may include, for example, the processor 120 of the server 106 factorizing the original weight matrix 602 into an initial estimate of the dictionary weight matrix 306 and an initial estimate of the intermediate matrix 310. In some cases, this may occur as follows. Given a pretrained weight matrix W with a size of $d \times d_W$, the weight matrix W can be factorized into a dictionary weight matrix D with a size of $d \times r$ and an intermediate matrix B' with a size of $r \times d_W$. In some embodiments, this factorization can be performed using singular value decomposition, where the weight matrix W is approximated into U with a size of $d \times r$, $\Sigma$ with a size of $r \times r$, and $V_F^T$ with a size of $r \times d_W$. This type of approximation can be expressed as follows.

$$W \approx U\Sigma V_F^T$$

The dictionary weight matrix D can be initialized as $D = U\Sigma$, and the intermediate matrix B' can be initialized as $B' = V_F^T$. Given that, the factorization of the original weight matrix 602 may be expressed as follows.

$$D, B' = \text{Factorization}(W, r) \approx U\Sigma, V_F^T$$

The intermediate matrix is pruned to generate a sparse intermediate matrix at step 806. This may include, for example, the processor 120 of the server 106 generating a sparse intermediate matrix B by removing smaller values from the intermediate matrix B'. As a particular example, the processor 120 of the server 106 may replace values b' in the intermediate matrix B' with values b in the sparse intermediate matrix B in the following manner.

$$b = \begin{cases} b' & \text{if } |b'| \geq \text{value}(t) \\ 0 & \text{otherwise} \end{cases}$$

Here, value(t) is the $(t \times d_W)^{th}$ largest value in B'. In this approach, any values in the intermediate matrix B' greater than or equal to value(t) remain in the sparse intermediate matrix B, while other values in the intermediate matrix B' are replaced with zeros in the sparse intermediate matrix B. Note that the joint factorization and pruning here can achieve a smaller model size compared to performing factorization or pruning on the original weight matrix W. This is because directly pruning the original weight matrix W with large sparsity can significantly reduce accuracy, and directly factorizing the original weight matrix W with a smaller rank r can significantly reduce accuracy.

Fine-tuning of the sparse intermediate matrix occurs using a training dataset to produce a fine-tuned sparse intermediate matrix at step 808. This may include, for example, the processor 120 of the server 106 generating a dictionary 308 as shown in FIG. 5A. Here, this may occur using the fine-tuning data 606. This may also include the processor 120 of the server 106 multiplying the resulting dictionary 308 with the sparse intermediate matrix B. This helps to fine-tune the sparse intermediate matrix B for use with downstream tasks.

An index matrix and a coefficient matrix are determined using the fine-tuned sparse intermediate matrix at step 810. This may include, for example, the processor 120 of the server 106 converting the sparse intermediate matrix B after fine-tuning into dense and tiny index and coefficient matrices 402 and 410. One example of how this might occur is shown in FIG. 5C and described above. The dictionary weight matrix, index matrix, and coefficient matrix are deployed at step 812. This may include, for example, the processor 120 of the server 106 initiating transmission of the dictionary weight matrix 306, index matrix 402, and coefficient matrix 410 to the electronic device 101 or other device(s).

Although FIG. 8 illustrates one example of a method 800 for training a small and fast transformer model for multi-modal or other tasks, various changes may be made to FIG. 8. For example, while shown as a series of steps, various steps in FIG. 8 may overlap, occur in parallel, occur in a different order, or occur any number of times.

Figure 9:
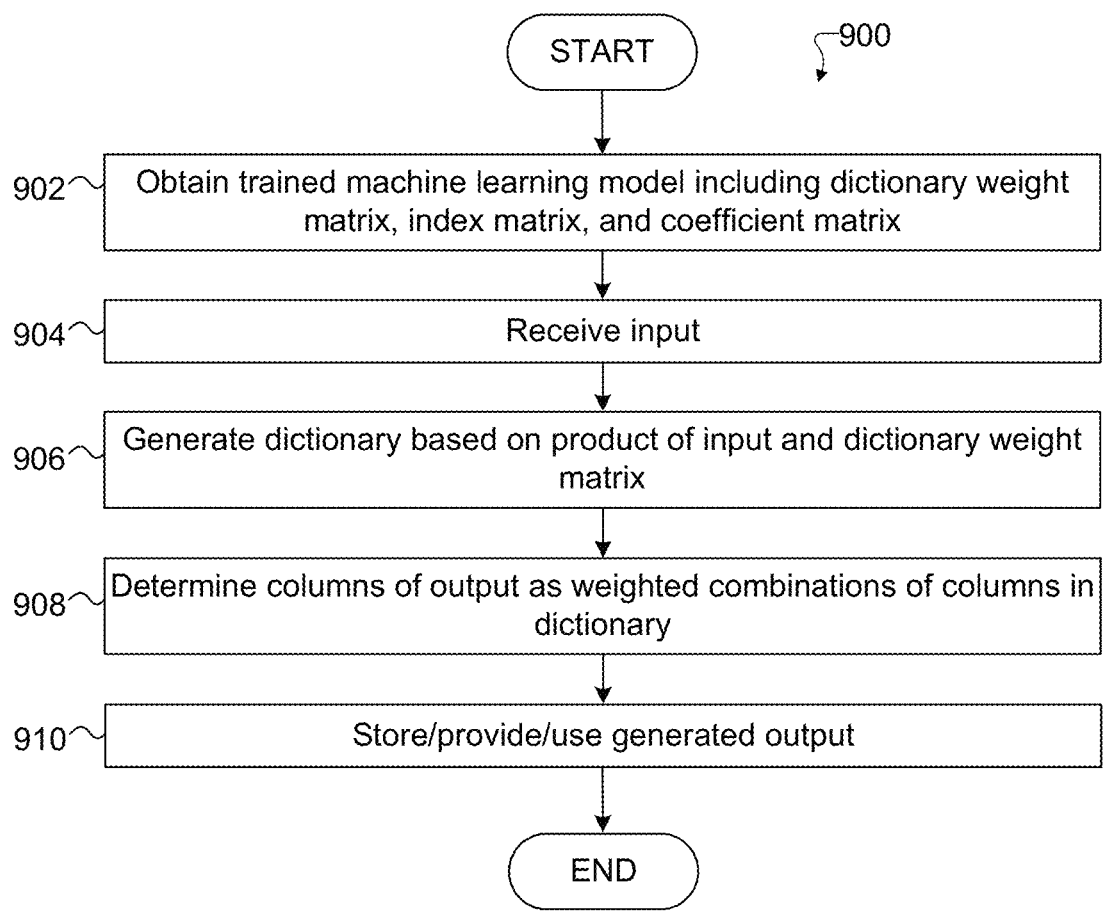
FIG. 9 illustrates an example method for using a small and fast transformer model for multi-modal or other tasks in accordance with this disclosure.

FIG. 9 illustrates an example method 900 for using a small and fast transformer model for multi-modal or other tasks in accordance with this disclosure. For ease of explanation, the method 900 shown in FIG. 9 is described as being performed using the electronic device 101 in the network configuration 100 of FIG. 1. However, the method 900 shown in FIG. 9 could be performed using any other suitable device (such as the server 106) and in any other suitable system.

As shown in FIG. 9, a trained machine learning model is obtained at step 902. This may include, for example, the processor 120 of the electronic device 101 obtaining the trained machine learning model from the server 106. The trained machine learning model can include the dictionary weight matrix 306, index matrix 402, and coefficient matrix 410 generated by the server 106 as described above. An input is received at step 904. This may include, for example, the processor 120 of the electronic device 101 receiving an input 302, such as a textual input 204 or features as determined by a visual encoder 206 and a textual encoder 208. In general, the input 302 received by the electronic device 101 can vary depending on the use case.

A linear combination is determined using the dictionary weight matrix 306, the index matrix 402, and the coefficient matrix 410 using the input 302. For example, a dictionary is generated based on a product of the input and the dictionary weight matrix at step 906. This may include, for example, the processor 120 of the electronic device 101 multiplying the input 302 by the weights in the dictionary weight matrix 306 to produce the dictionary 308. Each of one or more columns of an output is determined as a weighted combination of selected columns in the dictionary at step 908. This may include, for example, the processor 120 of the electronic device 101 accessing the index matrix 402 for each column 418 of the output 304 in order to identify index values 406 controlling which columns 408 of the dictionary 308 are to be combined in a weighted combination. This may also include the processor 120 of the electronic device 101 accessing the coefficient matrix 410 for each column 418 of the output 304 in order to identify weights 414 to be applied to the selected columns 408 of the dictionary 308. This may further include the processor 120 of the electronic device 101 performing the scale and sum operations 416 to combine the selected columns 408 of the dictionary 308 using the identified weights 414.

The generated output is stored, provided to one or more destinations, or otherwise used in some manner at step 910. The manner in which the output 304 is stored, provided, or otherwise used can vary widely depending on the circumstances. In FIG. 2, for example, the output of the textual encoder 208 may be provided to the multi-modal encoder 210, or the output of the multi-modal encoder 210 may be used to perform a desired function based on multi-modal features.

Although FIG. 9 illustrates one example of a method 900 for using a small and fast transformer model for multi-modal or other tasks, various changes may be made to FIG. 9. For example, while shown as a series of steps, various steps in FIG. 9 may overlap, occur in parallel, occur in a different order, or occur any number of times.

At least one dictionary lookup transformation or a small and fast transformer model for multi-modal or other tasks that incorporates at least one dictionary lookup transformation can be used to support any number of possible applications. The following represent example use cases where at least one dictionary lookup transformation or a small and fast transformer model can be used. Note, however, that these use cases are examples only and that the dictionary lookup transformation 300 or the transformer model 350 may be used in any other suitable manner for any other suitable purpose.

As one example use case, at least one dictionary lookup transformation 300 or at least one transformer model 350 can be used for efficient visual question answering (VQA) tasks on personal devices (such as smart televisions, smartphones, home robotics, or other electronic devices). As a particular example, a smart television with a VQA function may allow a user to ask questions during real-time viewing of video content, such as questions related to who or what is being displayed by the smart television. The smart television can analyze the user's questions along with the displayed video contents in order to initiate database queries, web searches, or other actions in response to the user's questions. Ideally, the smart television can identify answers to the user's questions and display or audibly present the answers to the user's questions to the user. This type of functionality can provide an improved interaction experience. For both training and inference phases in this use case, inputs can contain both images and auxiliary texts.

As another example use case, at least one dictionary lookup transformation 300 or at least one transformer model 350 can be used for efficient phrase grounding tasks on personal devices. Phrase grounding generally refers to tasks that align textual phrases with image regions to which the textual phrases refer. This can generally be thought of as a type of object detection that is conditional on a given text description. For both training and inference phases in this use case, inputs can contain both images and auxiliary texts. Similar to VQA tasks, phrase grounding tasks can be applied to smart televisions, smartphones, home robotics, or other electronic devices 101 in order to improve interactions between those devices and humans.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining, using at least one processing device of a first electronic device, a weight matrix associated with a trained transformer model;
factorizing, using the at least one processing device, the weight matrix into a dictionary weight matrix and an intermediate matrix;
pruning, using the at least one processing device, the intermediate matrix to generate a sparse intermediate matrix;
fine-tuning, using the at least one processing device, the sparse intermediate matrix based on a training dataset to generate a fine-tuned sparse intermediate matrix;
determining, using the at least one processing device, an index matrix and a coefficient matrix based on the fine-tuned sparse intermediate matrix; and
deploying the dictionary weight matrix, the index matrix, and the coefficient matrix to a second electronic device without deploying the weight matrix to the second electronic device;
wherein a number of parameters in the dictionary weight matrix, the index matrix, and the coefficient matrix is smaller than a number of parameters in the weight matrix.

2. The method of claim 1, wherein the trained transformer model comprises a text transformer.

3. The method of claim 1, wherein the trained transformer model comprises a multi-modal transformer.

4. The method of claim 1, wherein:
the trained transformer model comprises a text transformer; and
the obtaining, factorizing, pruning, fine-tuning, determining, and deploying are repeated for a second weight matrix associated with a second trained transformer model to generate a second dictionary weight matrix, a second index matrix, and a second coefficient matrix, the second trained transformer model comprising a multi-modal transformer.

5. The method of claim 4, further comprising:
deploying a visual encoder to the second electronic device;
wherein the second electronic device is configured to:
  use the visual encoder to process a visual input in order to generate first features;
  use the dictionary weight matrix, the index matrix, and the coefficient matrix to process a textual input in order to generate second features; and
  use the second dictionary weight matrix, the second index matrix, and the second coefficient matrix to process the first and second features in order to generate an output based on the visual input and the textual input.

6. The method of claim 5, wherein:
the visual input comprises one or more images;
the textual input comprises text associated with at least one object in the one or more images; and
the second dictionary weight matrix, the second index matrix, and the second coefficient matrix are configured to use the first and second features to identify the at least one object in the one or more images based on the text.

7. An apparatus comprising:
at least one processing device configured to:
  obtain a weight matrix associated with a trained transformer model;
  factorize the weight matrix into a dictionary weight matrix and an intermediate matrix;
  prune the intermediate matrix to generate a sparse intermediate matrix;
  fine-tune the sparse intermediate matrix based on a training dataset to generate a fine-tuned sparse intermediate matrix;
  determine an index matrix and a coefficient matrix based on the fine-tuned sparse intermediate matrix; and
  deploy the dictionary weight matrix, the index matrix, and the coefficient matrix to an electronic device without deploying the weight matrix to the electronic device;
wherein a number of parameters in the dictionary weight matrix, the index matrix, and the coefficient matrix is smaller than a number of parameters in the weight matrix.

8. The apparatus of claim 7, wherein the trained transformer model comprises a text transformer.

9. The apparatus of claim 7, wherein the trained transformer model comprises a multi-modal transformer.

10. The apparatus of claim 7, wherein:
the trained transformer model comprises a text transformer; and
the at least one processing device is further configured to process a second weight matrix associated with a second trained transformer model and generate a second dictionary weight matrix, a second index matrix, and a second coefficient matrix, the second trained transformer model comprising a multi-modal transformer.

11. The apparatus of claim 10, wherein:
the at least one processing device is further configured to deploy a visual encoder to the electronic device; and
the electronic device is configured to:
  use the visual encoder to process a visual input in order to generate first features;
  use the dictionary weight matrix, the index matrix, and the coefficient matrix to process a textual input in order to generate second features; and
  use the second dictionary weight matrix, the second index matrix, and the second coefficient matrix to process the first and second features in order to generate an output based on the visual input and the textual input.

12. The apparatus of claim 11, wherein:
the visual input comprises one or more images;
the textual input comprises text associated with at least one object in the one or more images; and
the second dictionary weight matrix, the second index matrix, and the second coefficient matrix are configured to use the first and second features to identify the at least one object in the one or more images based on the text.

13. A method comprising:
obtaining, by an electronic device that stores a trained machine learning model, an input, wherein the trained machine learning model comprises a dictionary weight matrix, an index matrix, and a coefficient matrix; and
determining, using the electronic device, an output corresponding to the input by performing a linear combination using the dictionary weight matrix, the index matrix, and the coefficient matrix;
wherein performing the linear combination comprises:
  generating a dictionary based on a product of the input and the dictionary weight matrix; and
  for each of one or more columns of the output, determining a weighted combination of columns in the dictionary, wherein the columns in the dictionary are selected based on the index matrix, and wherein weights applied to the selected columns in the dictionary are selected based on the coefficient matrix.

14. The method of claim 13, further comprising:
using the output as a second input to a second trained machine learning model, the second trained machine learning model comprising a second dictionary weight matrix, a second index matrix, and a second coefficient matrix; and
determining a second output using the second trained machine learning model by performing a second linear combination using the second dictionary weight matrix, the second index matrix, and the second coefficient matrix.

15. The method of claim 14, wherein:
the trained machine learning model comprises a textual encoder configured to process a textual input; and
the second trained machine learning model comprises a multi-model transformer configured to process a multi-modal input, the multi-modal input comprising the output of the trained machine learning model.

16. The method of claim 15, further comprising:
using a visual encoder to process a visual input;
wherein the multi-modal input further comprises an output of the visual encoder.

17. The method of claim 16, wherein:
the visual input comprises one or more images;
the textual input comprises text associated with at least one object in the one or more images; and
the multi-model transformer is configured identify the at least one object in the one or more images based on the text.

18. An apparatus comprising:
at least one memory configured to store a trained machine learning model, wherein the trained machine learning model comprises a dictionary weight matrix, an index matrix, and a coefficient matrix; and at least one processing device configured to:
  obtain an input; and
  perform a linear combination using the dictionary weight matrix, the index matrix, and the coefficient matrix to determine an output corresponding to the input;

wherein, to perform the linear combination, the at least one processing device is configured to:
  generate a dictionary based on a product of the input and the dictionary weight matrix; and
  for each of one or more columns of the output, determine a weighted combination of columns in the dictionary, the at least one processing device configured to select the columns in the dictionary based on the index matrix, and the at least one processing device configured to select weights applied to the selected columns in the dictionary based on the coefficient matrix.

19. The apparatus of claim 18, wherein the at least one processing device is further configured to:
  use the output as a second input to a second trained machine learning model, the second trained machine learning model comprising a second dictionary weight matrix, a second index matrix, and a second coefficient matrix; and
  perform a second linear combination using the second dictionary weight matrix, the second index matrix, and the second coefficient matrix to determine a second output.

20. The apparatus of claim 19, wherein:
the trained machine learning model comprises a textual encoder configured to process a textual input; and
the second trained machine learning model comprises a multi-model transformer configured to process a multi-modal input, the multi-modal input comprising the output of the trained machine learning model.

\* \* \* \* \*